United States Patent [19]

Brennan

[11] Patent Number: 5,731,957

[45] Date of Patent: Mar. 24, 1998

[54] TRANSPONDER INCLUDING A FLUID CUSHIONING MEDIUM AND A METHOD FOR ITS PRODUCTION

[75] Inventor: John E. Brennan, North Attleboro, Mass.

[73] Assignee: Texas Instruments Incorporated, Dallas, Tex.

[21] Appl. No.: 669,670

[22] Filed: Jun. 24, 1996

[51] Int. Cl.$^6$ .............................. H05K 7/00; H05K 7/12; H05K 5/06

[52] U.S. Cl. .................... 361/728; 174/171 LF; 342/51; 361/679

[58] Field of Search .............................. 174/17 R, 17 LF, 174/17 SF, 17.05, 20, 50.5, 50.51, 52.2, 52.3; 206/701, 719; 220/225, 226, 228, 655, 901; 257/687; 336/94, 96; 342/51, 572, 573; 361/728, 600, 742, 679, 746, 819, 820, 821, 836; 340/825, 825.31, 825.32

[56] References Cited

U.S. PATENT DOCUMENTS

| | | | |
|---|---|---|---|
| 4,992,794 | 2/1991 | Brouwers | 342/51 |
| 5,025,550 | 6/1991 | Zirbes et al. | 361/807 |
| 5,050,292 | 9/1991 | Zirbes et al. | 361/807 |
| 5,572,410 | 11/1996 | Gustafson | 361/807 |
| 5,606,488 | 2/1997 | Gustafson | 361/737 |

FOREIGN PATENT DOCUMENTS

| | | | |
|---|---|---|---|
| 4-302197 | 10/1992 | Japan | 361/807 |

*Primary Examiner*—Donald Sparks
*Attorney, Agent, or Firm*—James C. Kesterson; Richard L. Donaldson

[57] ABSTRACT

Transponder [A,B] formed of a bottom-closed elongate tubular enclosure [12] having a mouth [12'] at an upper end and circuit-receiving space within the enclosure for fully receiving an electronic transponder circuit assembly [15]. A cap [14,114] closes the mouth, the enclosure and cap each being of tough synthetic resin material which will not be damaged by being dropped and is intrinsically capable of absorbing shock to a substantial degree when so dropped. The circuit assembly is completely immersed in silicone oil or gel cushioning medium [16] so that it completely surrounds the circuit assembly in all directions, the cushioning medium providing absorption of impact energy. The silicone cushioning medium when within the closure has its fluid level extending above the seal and above an upper end [15'] of the circuit assembly. The cap is hermetically joined to the enclosure by ultrasonic welding. The transponder repeatedly survives a 2-meter drop test without failure of the circuit assembly. Method for assembling the transponder involves introducing silicone fluid is introduced into the enclosure using a dispensing needle having a tip placed at a closed bottom of the enclosure in order to minimize the creation of air pockets in the silicone, and the predetermined volume of silicone fluid so dispensed is slightly greater than volume available for the silicone fluid after introduction of the circuit assembly.

11 Claims, 1 Drawing Sheet

TRANSPONDER INCLUDING A FLUID CUSHIONING MEDIUM AND A METHOD FOR ITS PRODUCTION

BACKGROUND OF THE INVENTION

1. Field of the Invention

The invention relates to compact radio frequency transponders of the type known to be useful for security and information storage, access control, validation, identification, for example, and comparable other purposes. Such transponders may for such purposes be carried by a person or animal (as by tissue implantation) or on or within or about a vehicle for and thus typically require a miniaturized construction which incorporates transmitting/receiving circuits in a compact case.

2. Related Art

A compact RF transponder of the foregoing type and method for its production will be found disclosed in co-assigned U.S. Pat. No. 4,992,794, which is hereby incorporated by reference. Salient features of such prior transponder are represented in FIG. 3 of the present drawings. Any such compact RF transponder of this and related kinds used for purposes of the foregoing exemplary type are herein referred to simply by the term transponder. The transponder may include a hybridized electronic circuitry capable of transmit/receive operation, as by using FSK modulation, to transmit/receive digital information carrying the necessary intelligence, and may be an active or passive device.

When the transponder circuitry is housed in an enclosure made of glass, the transponder may not be able to survive a drop, such as determined by 2-meter drop test wherein the unit is dropped from a height of 2 m to concrete. Glass cracking or shattering is one possible failure mode. Another possible failure mode is damaging transfer of impact shock through rigid glass or other material of the enclosure to the fragile electronics circuitry within the enclosure, which may be referred to as the package. This shock may damage or destroy the circuitry, particularly the antenna, and thus prevent or interfere with transponder operation, such as making the transponder unreadable by interrogation devices or circuits.

Although the transponder circuitry could be housed in an enclosure made of plastic, as in said U.S. Pat. No. 4,992,794, Referring to FIG. 3, such transponder according to said U.S. Pat. No. 4,992,794 is generally designated 1 and has a plastic tube 2 closed with a bottom and shut off at the opposite end by a cap 4. Tube 2 has an electronic circuit element 5, e.g., as a chip, and other elements shown in said U.S. Pat. No. 4,992,794 but not shown in FIG. 3, viz., connected as by wire leads to windings of a ferrite core and to a capacitor. It is noted that the transponder may still be subject to breakage even when the plastic enclosure is partially filled with a filler material 6 such as polysiloxane.

SUMMARY OF THE INVENTION

It is in view of the above problems that the present invention was developed. Accordingly, the present invention is intended for such a technical application by providing an improved transponder having a package formed of so-called plastic, i.e., synthetic resin material, namely a suitable polymerized composition, which polymer is tougher than glass; which will absorb impact energy; which is resistant to cracking; which will be less likely to transfer shock to the electronics within the package; and which incorporates a cushioning medium, as in the form of silicone oil or gel, within the package for surrounding the electronics and protecting it and immobilizing it by submergence of the electronics within the cushioning medium.

The present invention also involves an advantageous specifically preferred process for preparing and assembling the transponder.

A specific polymer is preferred, and so constructed thereof, the transponder is found to be able to repeatedly tolerate 2-meter drop testing.

These and other objects and of the invention will be apparent or are pointed out in the following columns.

BRIEF DESCRIPTION OF THE DRAWINGS

Corresponding reference characters indicate corresponding elements among the views of the drawings.

DETAILED DESCRIPTION OF PRACTICAL EMBODIMENTS

Figure 1:
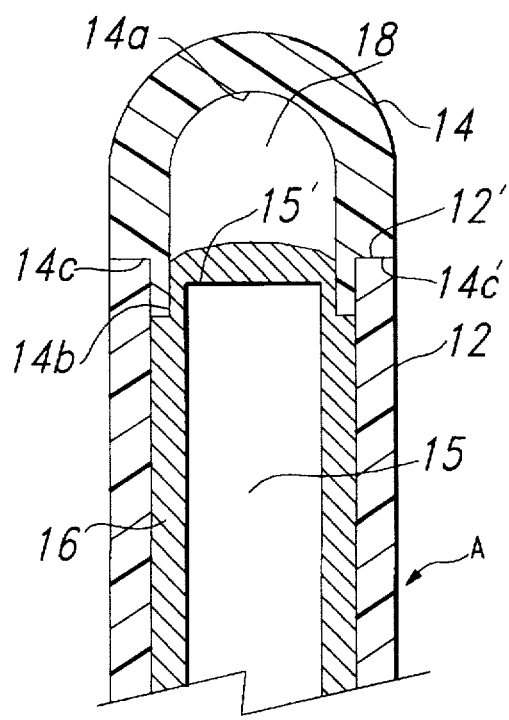
FIG. 1 is a fragmentary horizontal cross-section of a transponder package in accordance with an embodiment of the present invention.

Referring to FIG. 1, a transponder in accordance with the proposed construction is designated generally by reference character A and has a tubular enclosure 12 having generally cylindrical wall configuration and referred to in this description as tube 12, which is formed of synthetic resin material, namely a suitable polymerized composition, which polymer is tough and resilient and will not be damaged by being dropped, as well as being intrinsically capable of absorbing shock to a substantial degree. A specific polymer is preferred to provide requisite toughness, namely a synthetic resin commercially available under the tradename VECTRA.

The main body of such material, as may be formed according to preference by being injection molded, extruded, thermoformed or injection molded, and thereafter machined if necessary, is preferably in the form of an elongate closed tube as shown in said U.S. Pat. No. 4,992,794, being exemplary of circular cross section, and having a rounded closed bottom as therein illustrated, but closed at the opposite end by a cap 14, so that both ends may be of the same or similar rounded configuration as that shown in FIG. 1 for the end having cap 14, or the opposite end may be squared off in accordance with preferred usage for the ultimate technical application of the transponder.

Figure 3:
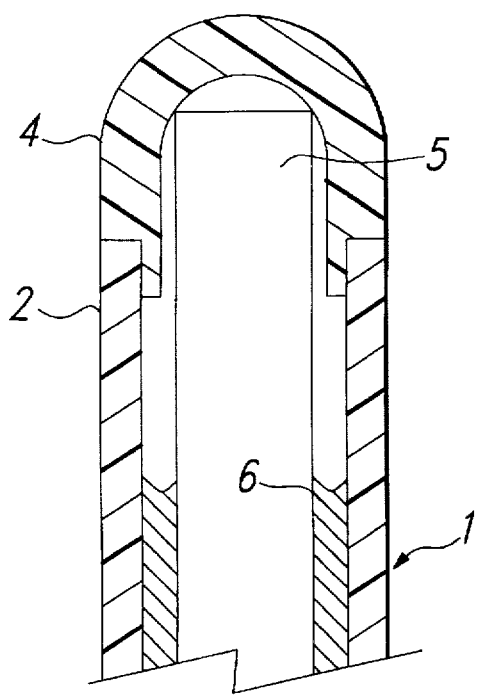
FIG. 3 is a fragmentary horizontal cross-section of a transponder package in accordance with a prior art configuration.

Tube 12 has within its elongate interior space, which space is of cylindrical configuration, an RF transponder circuit assembly 15 as of integrated circuit chip type, in accordance with the latter patent reference, which is hybridized electronic circuitry capable of transmitting or receiving or both transmitting or receiving signal information as in digital form for carrying or conveying or signifying the necessary intelligence, it being thus desired to protect the elongate circuit assembly 15 and its related elements, such as an antenna within tube 12 and other elements as shown in said U.S. Pat. No. 4,992,794 but not shown in FIG. 3, viz., connected as by wire leads to windings of a ferrite core and to a capacitor. That is, it is desired to protect the electronic circuit and any circuit elements in their position extending along and within tubular enclosure 12 against damage by shock transmitted to the transponder, for example, as when dropped such as might jeopardize or interfere with or otherwise affect operation.

Circuit assembly 15 terminates within tube 12 with an upper end 15' of the circuit assembly located proximally of a corresponding peripheral end face 12' of the lip or opening of tube 12, and thus circuit end 15' will not project beyond tube edge 12', for reasons presently appearing.

According to one embodiment, cap 14 is formed of the same material as tube 12 but of greater thickness to provide a dome-shaped interior 14a and a peripheral inner flange lab defining an L-shaped seat 14c including a flat portion 14c', whereby seat 14c may receive a corresponding portion of tube 12 and with peripheral end face 12' of the tube opening being tightly fitted against seat portion 14c', to which it will be sealed as described below.

Surrounding circuit assembly 15 is silicone oil or gel 16 which serves as a surrounding cushioning for the circuit assembly which is completely immersed therein. Thus, the fully submerged electronic assembly is surrounded in all directions by this fluid cushioning medium of silicone oil or gel, hereinbelow referred to simply as silicone, which will provide absorption of impact energy.

Transponder version A is prepared in the following manner. Tube 12, which is of bottom-closed character, is filled with a predetermined volume of the silicone less than the volume of tube 12. Such predetermined volume of the fluid silicone, whether oil or gel, is such than when the electronic assembly 15 is inserted within the tube, the upper end 15' of the circuit assembly will be below the mouth of tube 12, and so that circuit assembly 15 will not only be completely submerged but also will cause the surface of the silicone to be at or a point slightly above the lip surface 12' of the tube. Thus, as shown, the upper end 15' of the circuit assembly is located proximally of the peripheral end face 12' of the tube lip, i.e., the open mouth of the tube, being in any event not higher than or at or most preferably slightly below the level of the mouth or tube lip, to prevent contact of cap 14 with end 15' of the circuit assembly during subsequent sealing.

The predetermined volume of silicone introduced into the tube, preferably by method using a dispensing needle having a tip placed at the closed bottom of tube 12 in order to minimize the creation of air pockets in the silicone, may be slightly greater than the volume available for the silicone after introduction of circuit assembly 15, so that silicone can exude onto lip 12' of the tube. Cap 14 is then placed in contact with tube 12 in the orientation depicted in FIG. 1, with volume of the fluid in tube 12 being such that inserting the cap may cause fluid to be exuded from the enclosure from the tube mouth, i.e., onto the tube lip 12'. Then, cap 14 is ultrasonically welded to tube 12 to bring about a hermetic seal between faces 12' and 14c'. Such ultrasonic welding can be done through any silicone on the tube lip 12', and such maximizes the amount of silicone in the enclosure.

If cap 14 is of material different from the material constituting tube 12, it must similarly be of tough synthetic resin material resin material which will not be damaged by being dropped and will be intrinsically capable of absorbing shock to a substantial degree when so dropped; and it must be capable of being ultrasonically welded to tube 12 for closure to bring about requisite hermeticity.

From the foregoing it is seen that the silicone cushioning medium when within the closure having an upper fluid level, i.e., after insertion of the circuit assembly, the meniscus of the silicone extending above the seal and also above upper end 15' of the circuit assembly.

Figure 2:
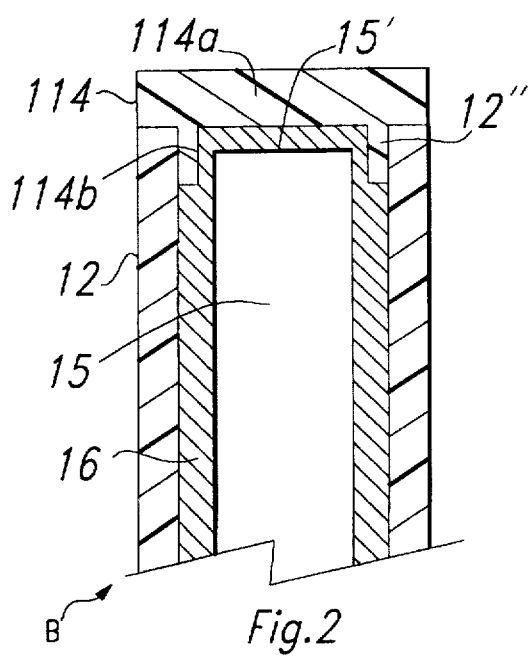
FIG. 2 is a fragmentary horizontal cross-section of a transponder package in accordance with a second embodiment of the present invention.

Although cap 14 includes internal dome 14a, to provide a dead space 18 over a meniscus-forming surface 17 of the silicone in which space air (or other fill gas) may remain, as for expansion, a different cap configuration may be used, as shown in the embodiment of FIG. 2.

Referring to FIG. 2, a version generally designated by reference character B includes tubular package 12 with circuit assembly 15 to be fitted a cap 114 with flat configuration. Cap 114, formed of the same material as cap 14, thus comprises a disc 114a from which depends an annular flange 114b fitted within the mouth of tube 12 in the same manner as the version of FIG. 1. The flat cap configuration eliminates a void or space over the surface of silicone 16.

Transponder version B is prepared in the same manner as version A, it being understood that the volume of silicone 16 introduced into tube 16 is again slightly greater than the volume available for the silicone after introduction of circuit assembly 15, so that silicone will exude onto lip 12' of the tube and, by observing precautions, cap 114 is placed in contact with tube 12 in the orientation depicted in FIG. 2 and ultrasonically welded to tube 12 to bring about a hermetic seal between face 12' and flange 114b by ultrasonic welding through any silicone on face 12', and leaving substantially no void or dead space.

From the foregoing it is seen that the silicone cushioning medium when within the enclosure has an upper fluid level, i.e., after insertion of the circuit assembly, the meniscus of the silicone extending above the seal and also above upper end 15' of the circuit assembly, and any excess silicone being thus exuded during insertion of the cad flange 114b into the mouth of tube 12.

The materials for tube 12 and cad 114 are of the same character as described for embodiment A.

Preferably, as to each version, the plastic tube and cap are all of the same material as described above, which need not have a rough surface, the toughness of the material being a desirable mechanical property and capability of being dropped without damage and of absorbing shock being in any event being comparably important.

Accordingly, various plastics having requisite toughness might be employed other than that described above.

Circuit assembly 15 may be coated with a layer of polyxylylene as an additional barrier to compounds or plastics that might tend to interfere with electrical performance.

Figure 4:
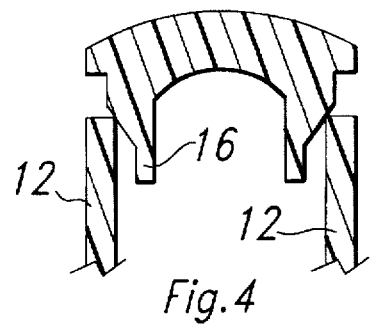
FIGS. 4 and 5 show two alternate cap configurations.
Figure 5:
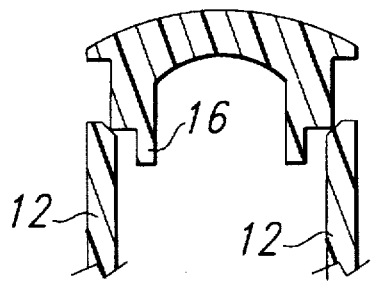
Figure 6:
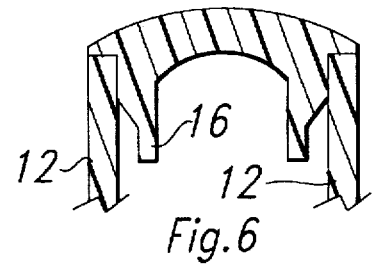
FIG. 6 shows a resulting tube and cap structure after ultrasonic welding of the alternate cap configuration of FIGS. 4 and 5 to a tube.

Referring now to FIGS. 4 and 5, there is shown two alternate cap configurations which were successfully welded to a receiving tube such as tube 12 shown in FIGS. 1 and 2. The resulting configuration of the tube 12 and the alternate cap embodiments is shown in FIG. 6. As shown, using the cap configurations of FIGS. 4 and 5 may result in an offset lip portion 116 which extends into tube 12 and is slightly spaced from the wall of tube 12.

The following example illustrates the effectiveness of the invention.

EXAMPLE

Two transponders with tubes and caps made in accordance with the foregoing teachings were assembled as described, the transponder circuits being of the type noted hereinabove. The units were tested for performance by a 2-meter drop to concrete. During each drop, the transponders typically bounced two to four times upon dropping to concrete. Both units were readable, i.e., exhibiting satisfactory RF performance, after 10 such drops each, with no damage to the plastic package, and thus repeatedly survived a 2-meter drop test without failure of the circuit assembly.

In view of the foregoing description of the present invention and embodiments and methods it will be seen that the several objects of the invention are achieved and other advantages are attained.

All matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A transponder comprising an elongate tubular enclosure of bottom-closed nature and defining a mouth at an upper end opposite from the bottom and circuit-receiving space within the enclosure, an electronic circuit assembly within said space having an upper end located proximally of the mouth and not projecting beyond the mouth, a cap for closing the mouth, the enclosure and cap each being of tough synthetic resin material which will not be damaged by being dropped and is intrinsically capable of absorbing shock to a substantial degree when so dropped, the cap being hermetically joined to the enclosure by a seal between the cap and enclosure, fluid cushioning medium within the enclosure, the circuit assembly being completely immersed in the cushioning medium whereby it completely surrounds the circuit assembly in all directions, the cushioning medium providing absorption of impact energy, the cushioning medium when within the closure having an upper fluid level extending above the seal and above the upper end of the circuit assembly, whereby the transponder repeatedly survives a 2-meter drop test without failure of the circuit assembly.

2. A transponder as set forth in claim 1 wherein the silicone is silicone oil or gel.

3. A transponder as set forth in claim 1 wherein the cap is domed, the cap defining a dead space above the cushioning medium when sealed to the enclosure.

4. A transponder as set forth in claim 2 wherein the cap is flat, cap defining no dead space above the cushioning medium when sealed to the enclosure.

5. A transponder as set forth in claim 1 wherein both the cap and the enclosure are each of synthetic resin commercially available under the tradename VECTRA.

6. A transponder as set forth in claim 1 wherein the cap defines a peripheral flange, the flange being received within the mouth of the enclosure.

7. A transponder as set forth in claim 1 wherein the cap is joined to the enclosure by ultrasonic welding.

8. A transponder as set forth in claim 1 where in the circuit assembly is coated with a layer of polyxylylene.

9. A transponder comprising:

an elongate tubular enclosure, the enclosure having generally cylindrical wall configuration and being of bottom-closed nature and defining a mouth at an upper end opposite from the bottom and defining circuit-receiving space within the enclosure;

an electronic circuit assembly within said space, the circuit assembly having an upper end located proximally of the mouth and not projecting above the mouth;

a cap for closing the enclosure mouth;

the enclosure and cap each being of tough synthetic resin material which will not be damaged by being dropped and is intrinsically capable of absorbing shock to a substantial degree when so dropped;

the cap being hermetically joined to the enclosure by a hermetic seal between opposed surfaces of the cap and enclosure;

fluid cushioning medium within the enclosure the circuit assembly being completely immersed in the cushioning medium whereby it completely surrounds the circuit assembly in all directions, the cushioning medium providing absorption of impact energy, the cushioning medium when within the closure having an upper fluid level extending above the seal and above the upper end of the circuit assembly;

whereby the transponder repeatedly survives a 2-meter drop test without failure of the circuit assembly.

10. A method of assembling a transponder having an elongate tubular enclosure of bottom-closed nature and defining a mouth of the enclosure at an upper end opposite from the bottom and circuit-receiving space within the enclosure, and an electronic circuit assembly for being received within said space, and a cap for closing the mouth, the enclosure and cap each being of tough synthetic resin material which may be ultrasonically welded, the method comprising:

filling the enclosure with a predetermined volume of silicone fluid less than the volume of the enclosure, inserting the electronic circuit assembly therein such than when the electronic circuit assembly is inserted within the tube, the assembly will not only be completely submerged in the silicone fluid but also will cause the surface of the silicone to be at or a point slightly above mouth of the enclosure, and with an upper end of the circuit assembly is located proximally of the mouth but not higher than the level of the mouth, placing the cap on the mouth such may cause the silicone fluid to be exuded from the mouth and surfaces thereof to be sealed to surfaces of the cap, and ultrasonically welding such surfaces through any silicone on the surfaces to bring about a hermetic seal between the cap and enclosure.

11. A method of assembling a transponder according to claim 10 wherein the silicone fluid is introduced into the enclosure using a dispensing needle having a tip placed at a closed bottom of the enclosure in order to minimize the creation of air pockets in the silicone, and the predetermined volume of silicone fluid less than the volume of the enclosure is slightly greater than the volume available for the silicone fluid after introduction of the circuit assembly.

* * * * *